US010257551B2

(12) United States Patent
Grandy et al.

(10) Patent No.: US 10,257,551 B2
(45) Date of Patent: Apr. 9, 2019

(54) SYSTEM AND METHOD FOR PROVIDING INTEGRATED MEDIA

(71) Applicant: INTEL CORPORATION, Santa Clara, CA (US)

(72) Inventors: Leslie L. Grandy, Woodinville, WA (US); Scott H. Ehrlich, Mercer Island, WA (US); Randy A. Meyerson, Seattle, WA (US); Edward T. Mahlum, Bainbrige Island, WA (US); Jeffrey M. Chasen, Redmond, WA (US); Olaf W. Kowalik, Shoreline, WA (US); Karim Meghji, Edmonds, WA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/376,213

(22) Filed: Dec. 12, 2016

(65) Prior Publication Data

US 2017/0094333 A1 Mar. 30, 2017

Related U.S. Application Data

(60) Continuation of application No. 14/705,860, filed on May 6, 2015, now Pat. No. 9,538,241, which is a (Continued)

(51) Int. Cl.
*H04N 21/2543* (2011.01)
*G06F 17/30* (2006.01)
(Continued)

(52) U.S. Cl.
CPC . *H04N 21/25435* (2013.01); *G06F 17/30867* (2013.01); *G06Q 20/123* (2013.01);
(Continued)

(58) Field of Classification Search
None
See application file for complete search history.

(56) References Cited

U.S. PATENT DOCUMENTS 6,314,572 B1 11/2001 LaRocca et al.
6,564,380 B1 5/2003 Murphy
(Continued)

OTHER PUBLICATIONS

U.S. Appl. No. 10/668,824, Non-Final Office Action, dated Jan. 29, 2009, 28 pages.
(Continued)

*Primary Examiner* — Omar S Parra
(74) *Attorney, Agent, or Firm* — Stoel Rives LLP

(57) ABSTRACT

Methods and system deliver media to users of media presentation systems. In accordance with one embodiment of the invention, a media server communicates with a media presentation system, such as a media player for streaming video and audio, to present subscription and non-subscription media to the user of the media presentation system. Subscription media may include multi-tiered media packages and individual media offerings as selected by the user. The media may be presented in various formats, including video, a graphical display, an audio presentation, a graphical and audio presentation, URL links, and interactive windows. Information about the user, the user's subscription status, the user's media presentation system and information about the media providers and the media offered by the media providers are maintained by the media server. The media server updates the foregoing information in accordance with the interaction between the media server, the users of media presentation systems, and the media providers.

15 Claims, 13 Drawing Sheets

A: USER INITIATES CLIENT SYSTEM
B: CLIENT SYSTEM SENDS MESSAGE TO MEDIA SERVER
C: MEDIA SERVER DETERMINES MEDIA TO SEND BASED ON SUBSCRIPTION
D: MEDIA SERVER SENDS MEDIA TO CLIENT SYSTEM
E: CLIENT SYSTEM PRESENTS MEDIA TO USER

Related U.S. Application Data division of application No. 12/719,680, filed on Mar. 8, 2010, now Pat. No. 9,055,315, which is a continuation-in-part of application No. 10/668,824, filed on Sep. 22, 2003, now abandoned.

(60) Provisional application No. 60/413,160, filed on Sep. 23, 2002.

(51) Int. Cl.

| | | |
|---|---|---|
| *G06Q 30/02* | (2012.01) | |
| *H04N 7/173* | (2011.01) | |
| *H04N 21/258* | (2011.01) | |
| *H04N 21/2668* | (2011.01) | |
| *H04N 21/462* | (2011.01) | |
| *H04N 21/472* | (2011.01) | |
| *H04N 21/485* | (2011.01) | |
| *H04N 21/61* | (2011.01) | |
| *H04N 21/81* | (2011.01) | |
| *H04N 21/845* | (2011.01) | |
| *G06Q 20/12* | (2012.01) | |
| *G06Q 20/14* | (2012.01) | |

(52) U.S. Cl.
CPC ....... *G06Q 20/145* (2013.01); *G06Q 30/0241* (2013.01); *G06Q 30/0257* (2013.01); *H04N 7/17336* (2013.01); *H04N 21/25866* (2013.01); *H04N 21/2668* (2013.01); *H04N 21/4622* (2013.01); *H04N 21/472* (2013.01); *H04N 21/485* (2013.01); *H04N 21/6125* (2013.01); *H04N 21/8173* (2013.01); *H04N 21/8193* (2013.01); *H04N 21/8453* (2013.01)

(56) References Cited

U.S. PATENT DOCUMENTS

| 6,760,916 B2 | 7/2004 | Holtz et al. |
| 2001/0049824 A1 | 12/2001 | Baker et al. |
| 2002/0004785 A1* | 1/2002 | Schull ................... G03B 13/02 705/51 |
| 2002/0049985 A1 | 4/2002 | Olshankshy et al. |
| 2002/0144279 A1* | 10/2002 | Zhou ................. H04N 7/17336 725/95 |
| 2002/0170053 A1 | 11/2002 | Peterka et al. |
| 2002/0194618 A1* | 12/2002 | Okada .................. G11B 27/105 725/132 |
| 2003/0126595 A1 | 7/2003 | Sie et al. |
| 2004/0148362 A1 | 7/2004 | Friedman |
| 2004/0205811 A1 | 10/2004 | Grandy et al. |
| 2005/0131910 A1 | 6/2005 | Yanagisawa |
| 2008/0059384 A1* | 3/2008 | Eglen ..................... G06Q 30/02 705/400 |
| 2008/0148056 A1 | 6/2008 | Ginter et al. |
| 2009/0254962 A1 | 10/2009 | Hendricks et al. |
| 2011/0138445 A1 | 6/2011 | Chasen et al. |

OTHER PUBLICATIONS

U.S. Appl. No. 10/668,824, Final Office Action, dated Jun. 12, 2008, 27 pages.

U.S. Appl. No. 10/668,824, Non-Final Office Action, dated Sep. 12, 2007, 23 pages.

U.S. Appl. No. 10/668,824, Final Office Action, dated Sep. 8, 2009, 30 pages.

U.S. Appl. No. 12/719,680, Non-Final Office Action, dated Apr. 12, 2012, 34 pages.

U.S. Appl. No. 12/719,680, Notice of Allowance, dated Feb. 20, 2015, 7 pages.

U.S. Appl. No. 12/719,680, Non-Final Office Action, dated Jul. 9, 2014, 29 pages.

U.S. Appl. No. 12/719,680, Non-Final Office Action, dated Nov. 21, 2013, 18 pages.

U.S. Appl. No. 12/719,680, Final Office Action, dated Nov. 8, 2012, 27 pages.

U.S. Appl. No. 14/705,860, Final Office Action, dated May 26, 2016, 8 pages.

U.S. Appl. No. 14/705,860, Non-Final Office Action, dated Oct. 13, 2015, 22 pages.

U.S. Appl. No. 14/705,860, Notice of Allowance, dated Sep. 6, 2016, 13 pages.

\* cited by examiner

Universal Player
From .AIFF to .X-STREAM, RealOne Player has never met a file type it didn't like. Now, the same Player that handles your streaming media and downloaded QuickTime, Windows Media or MPEG audio/video files can also play your DVDs, VCDs and store-bought or home-made CD-ROMS. Finally, digital media has become more manageable.

High Quality Video
New RealVideo 9™ delivers superior video quality over any type of Internet connection -- from narrowband to broadband. View and download DVD quality video starting at 500kbps. RealVideo 9™ supports all HDTV formats and resolutions.

TurboPlay
No more waiting for clips to load! New TurboPlay improves streaming so your clips load faster, start quicker and play smoother over all types of connections – from dialup to high-speed broadband.

Advanced Video Controls
Adjust your viewer just like a TV set for amazing picture quality. Handy sliders let you tweak your video controls for brightness, contrast, sharpness, hue, etc. Remembers your settings.

*FIG. 8*

SYSTEM AND METHOD FOR PROVIDING INTEGRATED MEDIA

RELATED APPLICATIONS

This patent application is a divisional of U.S. patent application Ser. No. 14/705,860, filed May 6, 2015, which is a divisional of U.S. patent application Ser. No. 12/719,680, filed Mar. 8, 2010, which is a continuation of U.S. patent application Ser. No. 10/668,824, filed Sep. 22, 2003, which claims the benefit under 35 U.S.C. § 119(e) of U.S. Provisional Application No. 60/413,160, filed Sep. 23, 2002, which is hereby incorporated by reference in its entirety.

BACKGROUND OF THE INVENTION

Field of the Invention

This invention relates to the delivery of media. More specifically, the invention provides a system and method for providing integrated media to subscribers and non-subscribers over a network.

Description of the Related Technology

The distribution of multimedia data, including video, audio, and image data, has become increasingly more effective, efficient, and flexible. Factors contributing to the improvement in distribution of multimedia data include the growing capability of the Internet and the underlying networking infrastructure, the growing capability and affordability of personal computers systems, high-speed access to the Internet by personal computer users, and the capability of efficiently processing multimedia data to provide an engaging and interesting experience for users. Multimedia data is sometimes preferable to text-only data in conveying content-rich information naturally and intuitively; moreover, advancements in multimedia presentations allow for interaction between the originator of the multimedia data and the viewer of the multimedia data. Additionally, improvements in computer database technology now allow for detailed personal data about the users of the multimedia to be maintained, updated, and accessed at an increasingly greater speed.

Some media providers, such as news agencies and television stations, now provide their media content over the Internet. This media content can generally be obtained on a subscription or non-subscription basis. For subscription-based media content, the users generally pay a monthly or pay-per-view fee to view the media content. The users generally also have to register and provide their personal information to the media provider in order to subscribe to the media content.

However, current systems of subscription-based media have several disadvantages. One disadvantage is that generally users have to register with each media provider in order to view that media provider's media. This results in excessive time spent registering with each media provider. Another disadvantage is that often media providers provide a package of media offerings. These media packages generally offer a fixed selection of media offerings, and the subscriber is often forced to subscribe to and pay for a media offering that the subscriber is not interested in.

Therefore, there is a need for personalized and customizable delivery of a multimedia experience to users with a choice of multi-tiered media subscriptions.

SUMMARY OF CERTAIN INVENTIVE ASPECTS

One aspect of the invention includes a method of delivering media, the method comprising maintaining a record comprising user information associated with a user of a client system, maintaining a plurality of media subscription levels, associating the record with the corresponding media subscription level, receiving a media request from the client system requesting a media selection, determining whether the user qualifies to receive the media selection according to the media subscription level, and delivering the media selection to the client system if the user qualifies to receive the media selection. This additionally comprises offering the media subscription level to the user if the user does not qualify to receive the media selection.

This additionally comprises the method wherein the media selection is delivered to the client system via the Internet. This additionally comprises maintaining a media player for the user for viewing the media selection. This additionally comprises modifying the media player according to the subscription level. This additionally comprises further controlling access by the user to features of the media player according to the media subscription level. This additionally comprises enabling the user to select one or more media offerings included in the subscription level. This additionally comprises enabling the user to alter the one or more media offerings included in the subscription level.

An additional aspect of the invention includes a computer system for delivering media, the computer system comprising a database module configured to store a record containing user information associated with a user of a client system and to store information corresponding to one of a plurality of media subscription levels for the record, a communication module configured to receive a media request from the client system, and to deliver the media selection to the client system, and a control module configured to determine whether the user qualifies to receive the media selection according to the one of the plurality of media subscription levels.

This additionally comprises the system wherein the control module is further configured to offer the media subscription level to the user if the user does not qualify to receive the media selection. This additionally comprises the system wherein the control module is further configured to deliver the media selection to the client system via the Internet. This additionally comprises a media player module configured to enable the user to view the media selection. This additionally comprises the system wherein the media player module is further configured to present the media selection according to the subscription level. This additionally comprises the system wherein the media player module is further configured to control access by the user to the features of the media player according to the media subscription level. This additionally comprises the system wherein the control module is further configured to enable the user to select one or more media offerings included in the subscription level. This additionally comprises the system wherein the control module is further configured to enable the user to select one or more media offerings included in the subscription level.

An additional aspect includes a computer readable medium having stored thereon instructions, which when executed by a computer processor perform the method comprising storing a record comprising user information associated with a user of a client system, storing a plurality of media subscription levels, associating the record with the corresponding media subscription level, receiving a media request from the client system requesting a media selection, determining whether the user qualifies to receive the media selection according to the media subscription level, and delivering the media selection to the client system if the user qualifies to receive the media selection.

This additionally comprises offering the media subscription level to the user if the user does not qualify to receive the media selection.

This additionally comprises the method wherein the media selection is delivered to the client system via the Internet. This additionally comprises maintaining a media player for the user for viewing the media selection. This additionally comprises modifying the media player according to the subscription level. This additionally comprises controlling access by the user to features of the media player according to the media subscription level. This additionally comprises enabling the user to select one or more media offerings included in the subscription level. This additionally comprises enabling the user to alter the one or more media offerings included in the subscription level An additional aspect includes a computer system for controlling access to a selected feature of a software application on a client computer, the computer system comprising a control module configured to launch the software application with a subset of available features enabled, wherein the subset does not include the selected feature, and an interface module configured to prompt a user to sign in to a server that can be coupled to the client computer via a network, and enabling the selected feature in response to a successful sign in.

This additionally comprises the system wherein the software application comprises a media player. This additionally comprises the system wherein the network is the Internet. This additionally comprises the system wherein the sign in also controls the user's access to media content that is selectively provided to the client computer on a subscription basis. This additionally comprises the system wherein the selected feature is a graphic equalizer. This additionally comprises the system wherein the selected feature is a screen selection mode that permits a user to vary a screen size for a multimedia presentation. This additionally comprises the system wherein the selected feature is an absence of or reduction in advertisements. This additionally comprises the system wherein the control module is further configured to receive an indication that the user has signed-off from the remote server, and to disable access to the selected feature in response to the sign off. This additionally comprises the system wherein the access to the software feature is controlled each time the software application is launched. This additionally comprises the system wherein the control module is further configured to receive an indication from the server that is provided in response to the sign in, and to control the enabling of the selected feature in response to the indication, in order to enable the selected feature in response to a successful sign.

An additional aspect includes a method of controlling access to a selected feature of a software application on a client computer, the method comprising launching the software application with a subset of available features enabled, wherein the subset does not include the selected feature, prompting a user to sign in to a server that is coupled to the client computer via a network, and enabling the selected feature in response to a successful sign in. This additionally comprises the method wherein the software application comprises a media player. This additionally comprises the method wherein the network comprises the Internet. This additionally comprises the method wherein the sign in also controls the user's access to media content that is selectively provided to the client computer on a subscription basis.

This additionally comprises the method wherein the selected feature is enabled for a sign in that is related to a first subscription that includes a plurality of media content providers, and the selected feature is disabled for a sign in that is related to a second subscription, where the second subscription includes at least one media content provider less than the plurality of media content providers. This additionally comprises the method wherein the selected feature comprises a graphic equalizer. This additionally comprises the method wherein the selected feature comprises a screen selection mode that permits a user to vary a screen size for a multimedia presentation. This additionally comprises the method wherein the selected feature is an absence of or reduction in advertisements.

This additionally comprises receiving an indication that the user has signed-off from the remote server and disabling access to the selected feature in response to the sign off. This additionally comprises the method wherein the access to the software feature is controlled each time the software application is launched. This additionally comprises the method wherein enabling the selected feature in response to a successful sign in further comprises receiving an indication from the server that is provided in response to the sign in, and controlling the enabling of the selected feature in response to the indication.

An additional aspect includes computer readable medium having stored thereon instructions, which when executed by a computer processor performs the method comprising launching a software application with a subset of available features enabled, wherein the subset the selected feature is disabled, prompting a user to sign in to a server via a network, and enabling the selected feature in response to a successful sign in.

This additionally comprises the method wherein the software application is a media player. This additionally comprises the method wherein the network is the Internet. This additionally comprises the method wherein the sign in also controls the user's access to media content that can be selectively provided to the client computer on a subscription basis. This additionally comprises the method wherein the selected feature is a graphic equalizer. This additionally comprises the method wherein the selected feature is a screen selection mode that permits a user to vary a screen size for a multimedia presentation. This additionally comprises the method wherein the selected features is an absence of advertisements.

This additionally comprises receiving an indication that the user has signed-off from the remote server, and disabling access to the selected feature in response to the sign off. This additionally comprises the method wherein the access to the software feature is controlled each time the software application is launched. This additionally comprises the method wherein the enabling of the selected feature in response to a successful sign in further comprises receiving an indication from the server that is provided in response to the sign in, and controlling the enabling of the selected feature in response to the indication.

An additional aspect includes a computer system for providing a software package in multiple tiers, the computer system comprising a single executable program comprising multiple tiers of a software package, a control module configured to permit a first tier of the software package to function, wherein the first tier includes fewer features than a second tier of the software package, to disable the second tier of the software package unless a condition is satisfied, and to enable the second tier of the software package when the condition is satisfied, and a communication module configured to communicate with a remote server via a network if the first condition is satisfied. This additionally comprises the system wherein the condition is a subscription to a service that requires a periodic payment.

An additional aspect includes a method of providing a software package in multiple tiers, the method comprising providing multiple tiers of a software package in a single executable, permitting a first tier of the software package to function, wherein the first tier includes fewer features than a second tier of the software package, disabling the second tier of the software package unless a condition is satisfied, communicating with a remote server via a network to determine if the first condition is satisfied, and enabling the second tier of the software package when the condition is satisfied. This additionally comprises the method wherein the condition is a subscription to a service that requires a periodic payment.

An additional aspect includes a computer readable medium having stored thereon instructions for providing a software package in multiple tiers, which when executed by a computer processing performs the method comprising including multiple tiers of a software package in a single executable, permitting a first tier of the software package to function, wherein the first tier includes fewer features than a second tier of the software package, disabling the second tier of the software package unless a condition is satisfied, communicating with a remote server via a network to determine if the first condition is satisfied, and enabling the second tier of the software package when the condition is satisfied. This additionally comprises the method wherein the condition is a subscription to a service that requires a periodic payment.

An additional aspect includes a computer system for controlling playback of media content, the computer system comprising a communication module configured to receive a request for subscription media content, a control module configured to determine whether sign-in information has been provided to enable access to the subscription media content and an interface module configured to provide a sign-in process in response to an unsuccessful sign in to enable the access to the subscription media content, to retrieve the subscription media content in response to a successful sign in, and to initiate playback of the subscription media content in response to the successful sign in, without receiving another request for the subscription media content. This additionally comprises the system wherein the request from the user is a selection of a hyperlink that corresponds to the subscription media content.

An additional aspect includes a method of controlling playback of media content, the method comprising receiving a request for subscription media content, determining whether sign-in information has been provided that permits access to the subscription media content, providing a sign-in process in response to an unsuccessful sign in such to enable access to the subscription media content, automatically retrieving the subscription media content in response to a successful sign in, and automatically initiating playback of the subscription media content in response to the successful sign in, without receiving another request for the subscription media content. This additionally comprises the method wherein the request from the user is a selection of a hyperlink that corresponds to the subscription media content.

An additional aspect includes a computer readable medium having stored thereon instructions for controlling playback of media content, which when executed by a computer processor perform the method comprising receiving a request from a user for subscription media content, determining whether the user has provided sign-in information that permits access to the subscription media content, providing a sign-in process upon indication of an unsuccessful sign in to enable access to the subscription media content, automatically retrieving the subscription media content in response to a successful sign in, and automatically initiating playback of the subscription media content in response to the successful sign in, without receiving another request for the subscription media content. This additionally comprises the method wherein the request from the user is a selection of a hyperlink that corresponds to the subscription media content.

An additional aspect includes a method of allocating subscription fees for media content, the method comprising providing a first fee to a media content provider in response to a first subscription from a first user, where the first subscription includes only a subscription to the media content provider, where the media content provider provides access to subscription-only content over a computer network, and providing a second fee to the media content provider in response to a second subscription from a second user, where the second subscription includes a plurality of subscriptions to a plurality of media content providers that includes the media content provider, where the second fee is different from the first.

This additionally comprises the method wherein the second fee is higher than the first fee. This additionally comprises the method wherein the computer network is the Internet. This additionally comprises the method wherein the computer network transmits media content that is in a packet format. This additionally comprises the method wherein the first fee and the second fee are provided to the media content provider electronically. This additionally comprises the method wherein the media content provider provides a media content. This additionally comprises the method wherein the media content comprises audio and video content. This additionally comprises the method wherein the media content is streamed over the computer network.

BRIEF DESCRIPTION OF THE DRAWINGS

FIG. 8 is a screen shot illustrating an example of a video features screen that may be displayed by the media delivery system.

FIG. 11 is a screen shot illustrating an example of a screen that may be displayed by the media delivery system when the user is logged in.

FIG. 12 is a screen shot illustrating an example of a screen that may be displayed by the media delivery system when the user is not logged in.

DETAILED DESCRIPTION OF CERTAIN EMBODIMENTS

Figure 1:
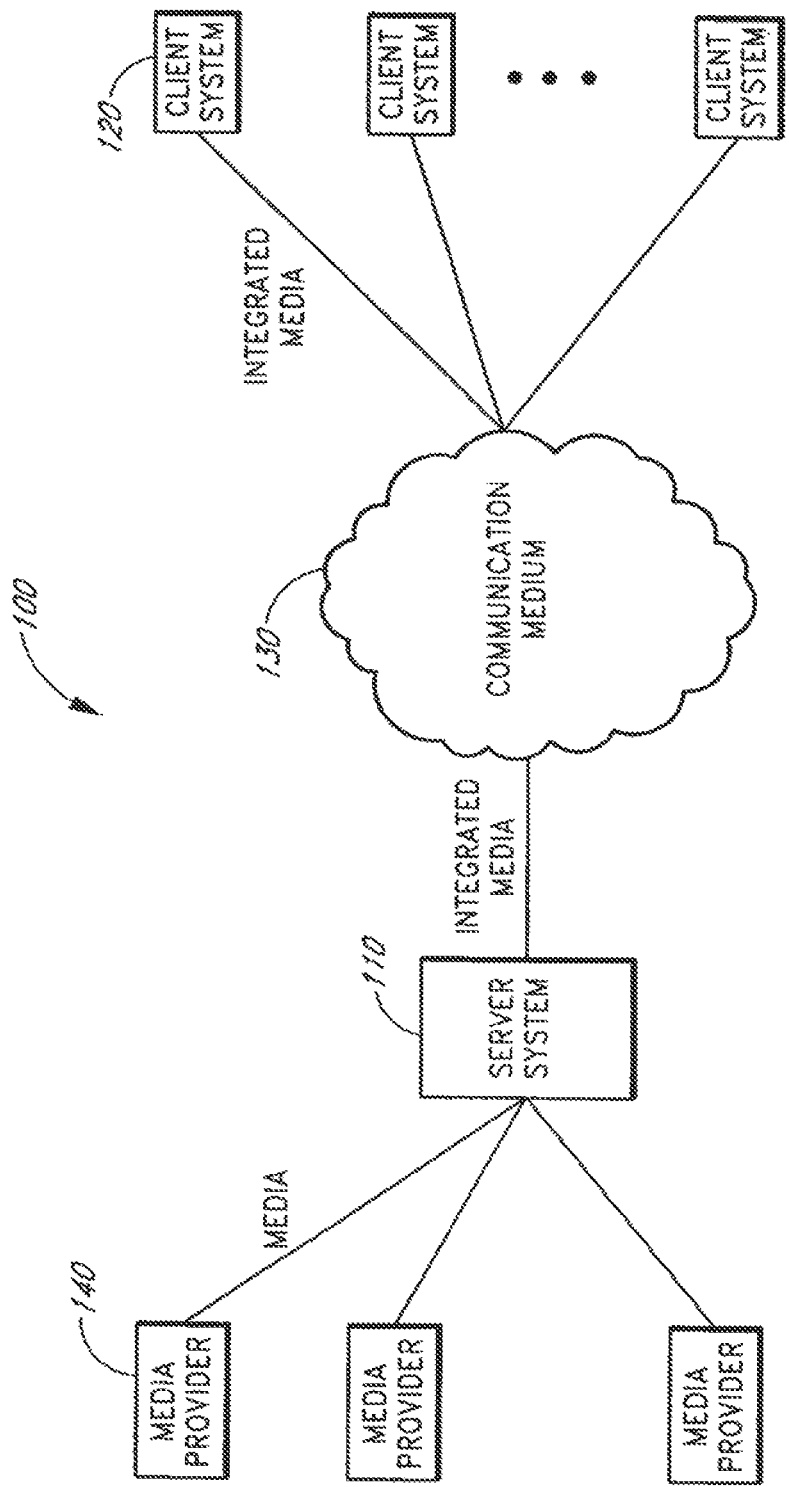
FIG. 1 illustrates a block diagram of an integrated media delivery system, according to aspects of an embodiment of the invention.

Systems and methods which represent embodiments and example applications of the invention will now be described with reference to the drawings. Variations to the systems and methods which represent other embodiments will also be described. In one disclosed embodiment, the system and method are used to provide a personalized and customizable delivery of a multimedia experience, with a choice of multi-tiered media subscriptions, to users of a multimedia client program or media presentation system. However, the present invention is not limited by the type of client program used. Other types of client programs may be used such as, for example, a word processor, a software game, a recipe program, a spreadsheet program, a database program, a tax preparation program, and so forth. The figures and descriptions, however, relate to embodiments of the invention wherein the client program is a multimedia program. It is also recognized that in other embodiments, the systems and methods may be implemented as a single module and/or implemented in conjunction with a variety of other modules and the like.

The features of the systems and methods will now be described with reference to the drawings summarized above. Throughout the drawings, reference numbers are re-used to indicate correspondence between referenced elements. In addition, the first digit of each reference number indicates the figure in which the element first appears. The drawings, associated descriptions, and specific implementation are provided to illustrate embodiments of the invention, and not to limit the scope of the invention. The scope of the invention is defined by the appended claims.

I. Overview

Embodiments of the systems and methods provide media to users of media presentation systems. Generally, media refers to various forms of communication and data that convey information to a user, and may include a variety of data formats, such as, for example, video, voice, image, flash, audio, visual, and so forth. Media may convey any information or message, such as news, weather reports, movies, television programs, music, and the like. Media may also contain marketing, advertising, and consumer relations messages.

Media providers may be any organization, company, or source that creates, distributes, syndicates, or provides media to users. The media made available by media providers may be referred to as a "media offering". Examples of media providers include CNN®, ABC News®, The Weather Channel®, The Wall Street Journal®, CNN Money®, RealOne Radio®, CNN Sports Illustrated®, NASCAR.com®, NBA TV®, MLB.com Gameday Audio®, FoxSports®, E!®, iFilm®, Old Time Radio®, and the like. For example, CNN® provides media relating to news with hourly updated newscast with world headlines, extended news reports and interviews. The Wall Street Journal® provides media relating to the latest market and business news. RealOne Radio® provides 100% ad-free radio and access to over 50 commercial free, interruption free, and DJ-free radio stations across a wide range of genres. The Weather Channel® provides national, regional, and local weather. FoxSports® provides video highlights from every major sports league—baseball, football, hockey, motor sports, golf, tennis, extreme sports and the like, and highlights from other Fox Sports® programs.

II. Integrated Media Delivery System

FIG. 1 illustrates a block diagram of an integrated media delivery system 100, according to aspects of one embodiment. As illustrated in FIG. 1, the integrated media delivery system 100 includes a server system 110 and one or more client systems 120 that communicate via a communications medium 130. The integrated media delivery system 100 further includes one or more media providers 140 communicating with the server system 110.

A. Server System

Figure 2:
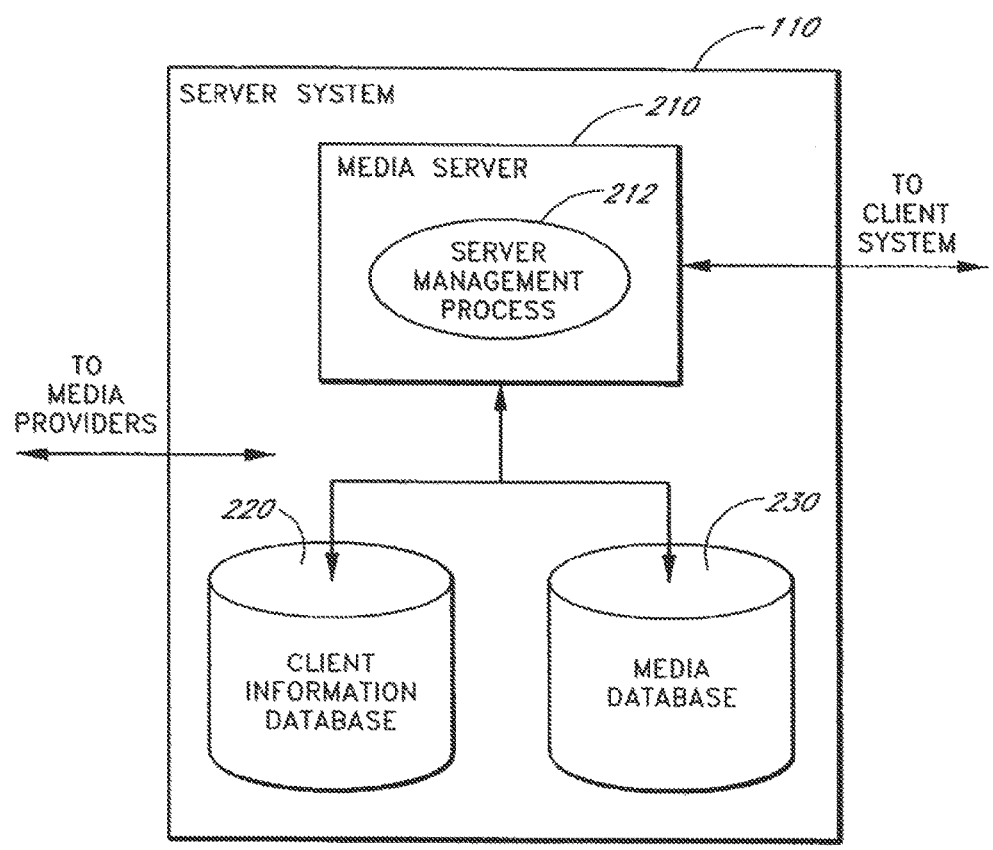
FIG. 2 illustrates a block diagram of a server system, according to aspects of an embodiment of the invention.

FIG. 2 illustrates a block diagram of the server system 110, according to aspects of an embodiment of the invention. The server system 110 includes a media server 210, a client information database 220, and a media database 230. For example, the server system 110 may comprise a digital media delivery platform such as the Helix Universal Server® available from RealNetworks, Inc.

1. Media Server

In one embodiment, the server system 110 includes the media server 210 which may be used to select and send media to the client system 120 via the communications medium 130. The media server 210 includes a server management process 212.

In one embodiment, the media server 210 runs on a computer that enables the server system 110 to communicate with the client system 120. The computer may be a general purpose computer using one or more microprocessors, such as, for example, a Pentium® processor, a Pentium II® processor, a Pentium Pro® processor, a Pentium IV® processor, an x86 processor, an 8051 processor, a MIPS processor, a Power PC® processor, a SPARC® processor, an Alpha® processor, and so forth.

In one embodiment, the processor unit runs the Microsoft® Windows NT operating system and performs standard operating system functions. It is recognized that other operating systems may be used, such as, for example, Microsoft® Windows® 3.X, Microsoft® Windows 98, Microsoft® Windows® 2000, Microsoft® Windows® 95, Microsoft® Windows® CE, Microsoft® Windows® ME, Palm Pilot OS, Apple® MacOS®, Disk Operating System (DOS), UNIX, IRIX, Solaris, SunOS, FreeBSD, Linux®, IBM® OS/2® operating systems, and so forth.

In one embodiment, the computer is equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the computer may be configured to support a variety of network protocols such as, for example NFS v2/v3 over UDP/TCP, Microsoft® CIFS, HTTP 1.0, HTTP. 1.1, DAFS, FTP, Real-Time Streaming Protocol ("RTSP") by RealNetworks, Inc., and so forth.

In one embodiment, the server management process 212 includes one or more computer programs or processes that perform the functions of the media server 210. Examples of the functions performed by the server management process 212 include communication with the client information database 220, communication with the media database 230, communication with one or more client systems 120, communication with one or more media providers 140, communication with the communications medium 130, and the like. Although some of the functions of the server management process 212 are specified herein, it is to be understood that the server management process 212 may perform a variety of functions to enable the media server 210 to perform its tasks within the integrated media delivery system 100.

2. Client Information Database

The client information database 220 stores information about users of the integrated media delivery system 100, as well as information about the users' systems and users' subscription information. This information, which may be referred to as a "user information" or "user profile," may include information such as, for example, the user's first name, login/password, zip/postal code, gender, age, e-mail address, IP address, and payment information, as well as other user identification information. Moreover, the information may also relate to the user's subscription information including data on the license model or subscription package that the user has purchased indicating what type of content the user may access (e.g., specific artists, specific categories of contents, specific media providers, etc.), as well as the format in which the user may access the content (e.g., streaming, download, etc.). In addition, the information may also include the features for which the user has chosen to enable access, as well as features that have been automatically enabled for the user. Examples of these features are included and described below. It is recognized, however, that the client information database 220 may store a variety of user information. In one embodiment the client information database 220 maintains the user information in the form of records, with each record containing user information associated with the user of the client system 120. The user record information may contain the user information discussed herein or may include other data about the user.

As illustrated in FIG. 2, the media server 210 communicates with the client information database 220. In one embodiment, the media server 210 communicates with the client information database 220 using an Application Program Interface ("API"). Generally, an API is an interface, or a defined calling convention, by which an application program accesses the services of another application, such as an operating system. In one embodiment, the communication between the media server 210 and the client information database 220 is performed using Structured Query Language ("SQL") commands. Furthermore, as illustrated in FIG. 2, the media server 210 communicates with a media database 230. In one embodiment, the communication between the media server 210 and the media database 230 is performed using SQL. In other embodiments, the media server 210 may communicate with the media database 230 using other programs, such as, for example, via an API.

3. Media Database

The media database 230 stores information about the media and content that is to be presented to the users of the integrated media delivery system 100. In one embodiment, the media database 230 advantageously maintains a decision-making logic for determining the media or features to be presented to the client system 120. In connection with the client information database 220 and the media database 230, there may be several processes (not shown) such as ID generators, number generators statistic generators, session generators, and temporary storage units that work with the databases. Furthermore, it is recognized that the databases may be implemented using a variety of different databases such as relational databases, flat file databases, and/or object-oriented databases. Moreover, while the databases depicted in FIG. 2 are illustrated with two separate databases, it is recognized that in other embodiments, the databases may be implemented as a single database and/or one or both of the databases may include other databases. In addition, one or both of the databases may be implemented as other data structures that are well known in the art, such as linked lists, stacks, binary trees, and so forth.

B. Client System

Figure 3:
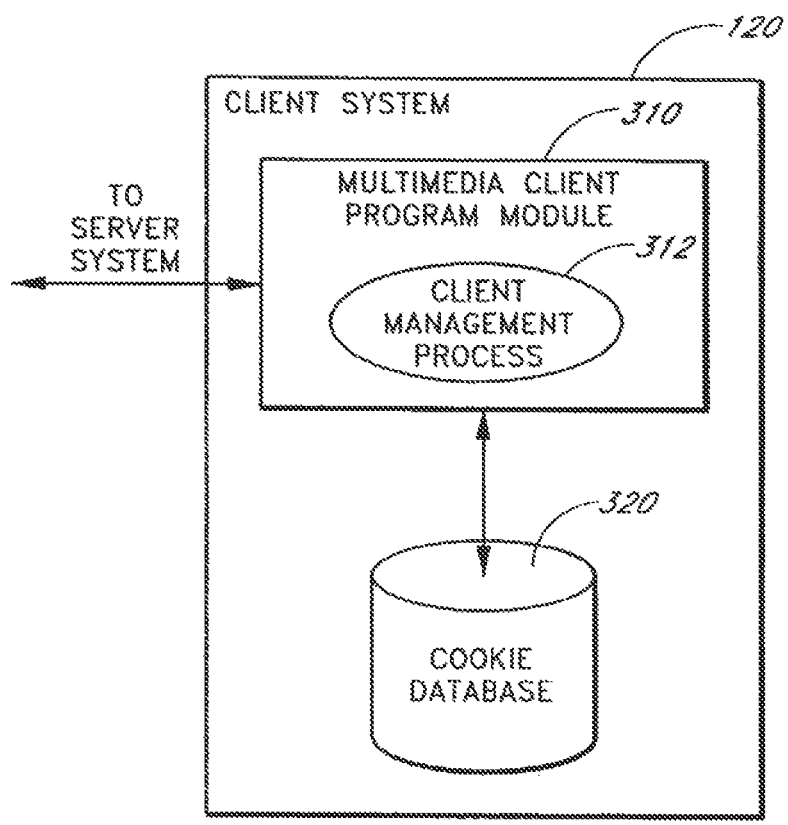
FIG. 3 illustrates a block diagram of a client system, according to aspects of an embodiment of the invention.

FIG. 3 illustrates one embodiment of the client system 120 illustrated in FIG. 1. The exemplary client system 120 includes a multimedia client program module 310 and a cookie database 320.

As used herein, the word "module", whether in upper or lower case letters, refers to logic that may be embodied in hardware or in firmware, or to a collection of software instructions, possibly having entry and exit points, written in a programming language, such as, for example, C++. A software module may be compiled and linked into an executable program, included in a dynamic link library, or may be written in an interpretive language such as BASIC. A software module or program may be in an executable state or referred to as an executable. An 'executable' generally means that the program is able to operate on the computer system without the involvement of a computer language interpreter. The term 'automatically' generally refers to an operation that performs without significant user intervention or with some limited user intervention. The term 'launching' generally refers to initiating the operation of a computer module or program. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

1. Multimedia Client Program Module

The multimedia client program module ("multimedia client program") 310 may permit a user access to a variety of media content including multimedia content. The multimedia content may include, for example, audio data (e.g., Audio Interchange File Format (AIFF) files, AU files, RealAudio files, analog audio, Moving Picture Experts Group (MPEG) audio layer 3 (MP3) files, WAV files, radio stations audio output, etc.), video data (e.g., Advanced Streaming Format (ASF) files, Real Video files, QuickTime files, Vivo files, MPEG-1, MPEG-2, Audio Video Interleave (AVI), digital video disc or digital versatile disc (DVD), MPEG-4, etc.), image data (e.g., tagged image file format (TIFF) files, graphics interchange format (GIF) files, Joint Photographic Experts Group (JPEG) files, Portable Network Graphics (PNG) files, etc.), Web data (e.g., HyperText Markup Language (HTML) pages, Java-based Web pages, etc.), Synchronized Multimedia Integration Language (SMIL) content data, streaming flash data, Video Compact Disc data, as well as other types of multimedia data. The multimedia content may be stored on the user computer in a content database (not shown) and/or in a remote location, such as, for example, in a remote database or on a streaming server. In some embodiments, the multimedia client program 310 includes a Web browser, whereas in other embodiments, the multimedia client program 310 works in conjunction with a Web browser. A Web browser is typically a software program that permits a user to access various Web servers, including content providers, through the communications medium 130. The Web browser may include the Netscape® Navigator developed by Netscape, Inc. or the Microsoft® Internet Explorer developed by Microsoft Corporation; however, other types of access software may also be used to implement a Web browser, such as, for example, other types of Internet browsers, customer network browsers, two-way communications software, cable modem software, point-to-point software, and the like.

The exemplary multimedia client program 310 includes a client management process 312. In one embodiment, the multimedia client program 310 includes an audio player, a video player, a digital music/video jukebox, and a built-in media browser (not shown). In addition, the multimedia client program 310 provides users with access to a network of multimedia programming, such as radio stations, software games, information on current events, sports, entertainment, news, and so forth.

In one embodiment, the client management process 312 includes one or more computer programs or processes that perform the functions of the multimedia client program module 310. Examples of the functions performed by the client management process 312 include communication with the cookie database 320, communication with the server system 110, communication with one or more media providers 140, communication with the communications medium 130, and the like. Although some of the functions of the client management process 312 are specified herein, it is to be understood that the client management process 312 may perform a variety of functions to enable the multimedia client program module 310 to perform its tasks within the integrated media delivery system 100.

2. Cookie Database

The exemplary cookie database 320 is a collection of cookie files stored on the client system 120. The cookie files contain small pieces of information, such as user name and preferences, which a server can store with a Web browser or other program and later read back from that browser or program. This is useful for having the multimedia client program 310 and/or a Web browser remember specific information from various pages. For example, when a user downloads a program from a Web site, the program name, type, and version may be stored in a cookie file so that the client system 120 knows information about the downloaded program and can provide such information to remote servers.

In connection with the cookie database 320, there may be several processes (not shown) such as ID generators, number generators, statistic generators, session generators, and temporary storage units that work with the database. Furthermore, it is recognized that the database may be implemented using a variety of different databases in addition to or instead of the cookie database 320, such as relational databases, flat file databases, and/or object-oriented databases. Moreover, it is recognized that in other embodiments, the database may be implemented as two or more databases and may include other databases. In addition, the database may be implemented as other data structures that are well know in the art such as linked lists, stacks, binary trees, and so forth.

3. System Information

In one embodiment, the client system 120 enables the user to communicate with the server system 110 via the communications medium 130. The client system 120 may be a general purpose computer using one or more microprocessors, such as, for example, a Pentium processor, a Pentium II processor, a Pentium Pro processor, a Pentium IV processor, an x86 processor, an 8051 processor, a MIPS processor, a Power PC processor, a SPARC processor, an Alpha processor, and so forth.

In one embodiment, the processor unit runs the Microsoft® Windows® XP operating system and performs standard operating system functions. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Palm Pilot OS, Apple® MacOS®, Disk Operating System (DOS), UNIX, IRIX, Solaris, SunOS, FreeBSD, Linux®, IBM® OS/2® operating systems, and so forth.

In one embodiment, the client system 120 is equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the client system 120 may be configured to support a variety of network protocols such as, for example NFS v2/v3 over UDP/TCP, Microsoft® CIFS, HTTP 1.0, HTTP 1.1, DAFS, FTP, RTSP, and so forth.

4. An Example of a Client System

As an example, the client system may have the following components and features:

Intel Pentium® series processor and associated motherboard;

64 MB or greater RAM;

International Telecommunication Union V.90 or V.92 modem or Local area network card with network and/or Internet connection;

speakers and sound card (internal or embedded in the speakers);

color video display card and associated monitor;

Windows® operating system, e.g. Windows® XP operating system; and

Internet Explorer browser 5.0 or Later.

C. Communications Medium

Focusing now on the communications medium 130, the presently preferred communication medium 130 may include the Internet. Generally, the Internet is a wide-area network with routing hubs and domain name system (DNS) servers, as is well known in the art. DNS is a Transfer Control Protocol/Internet protocol (TCP/IP) service that translates domain names to and from Internet Protocol (IP) addresses. The routing hubs connect to one or more other routing hubs via high-speed communication links. One popular part of the Internet is the World Wide Web (the "Web"), which includes different computers that store electronic Web documents via the Web sites. The term "site" is not intended to imply a single geographic location, as a Web site or other network site can, for example, include multiple geographically distributed computer systems that are appropriately linked together. Generally, the electronic Web documents may display a variety of data, such as, graphical images, audio, video, and so forth.

One of ordinary skill in the art will recognize that a wide range of interactive communication mediums may be employed in embodiments of the present invention. For example, the communications medium 130 may include the Intranet, the World Wide Web, interactive television networks, telephone networks, wireless networks, wireline networks, cellular networks, wireless data transmission systems, two-way cable systems, customized computer networks, interactive kiosk networks, local area networks, wide area networks, satellite networks, intranet networks, broadband networks, baseband networks, and the like, as well as any combination of the above.

D. Multimedia Client Program Interface

As noted above, in some embodiments, the client program is a multimedia client program, though it is recognized that a variety of client programs may be used. The multimedia client program may be any program, application, plug-in, or module that may be used to play audio files in a variety of formats, to view video and image data, to retrieve and send Web documents, and so forth. In another embodiment, the multimedia client program may also record audio, video, and other data files in a variety of formats. For example, the multimedia client program may be an audio player, a video player, a Web browser, a flash media player, a streaming video player, a streaming audio player, a game application, and so forth, as well as any combination of the above.

1. Sample Multimedia Client Program Interface

Figure 4:
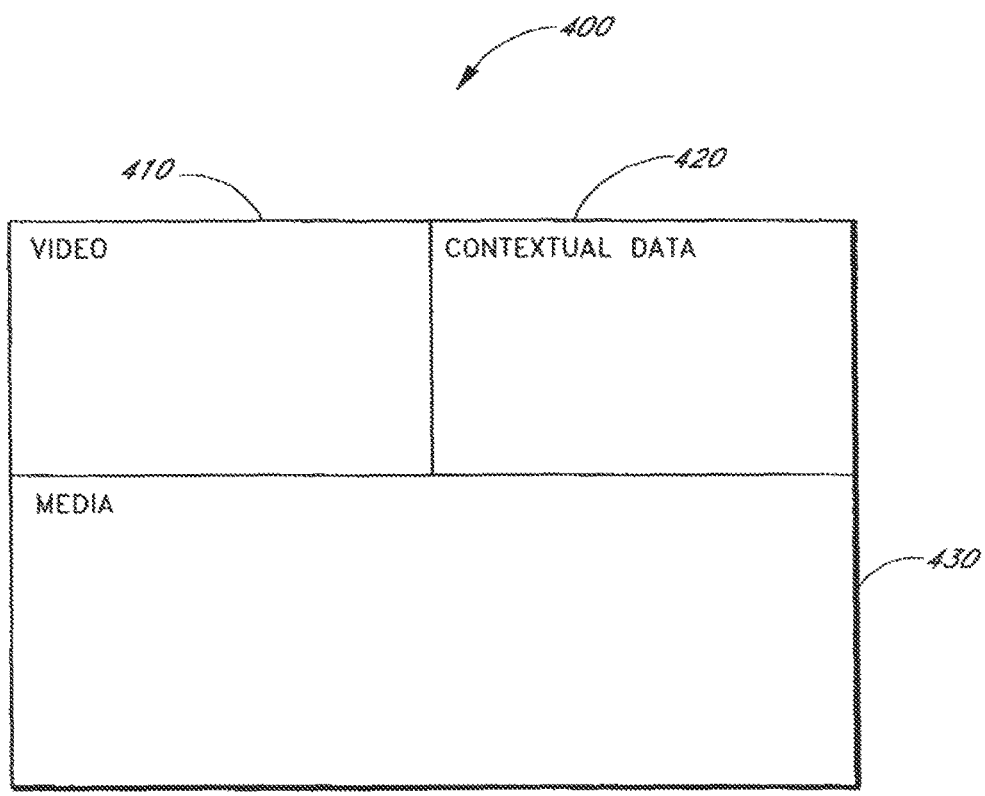
FIG. 4 illustrates a display screen layout of a multimedia client program interface, according to aspects of an embodiment of the invention.

FIG. 4 illustrates an exemplary multimedia client program interface 400 of a multimedia client program 310, according to aspects of an embodiment of the invention. As illustrated, the multimedia client program interface 400 comprises a video section 410, a contextual data section 420, and a media section 430. The video section 410 may display video and audio media such as, for example, television programs, sporting events, news, movies and the like. The contextual data section 420 may display information regarding media being displayed in the video section 410. The media section 430 may display a variety of media to the user such as, for example, a list of media channels along with links to the media channels, description of a television program with a link to the television program, marketing media, links to content on the Web and the Internet, displays of offers to upgrade subscription, and the like.

It is recognized that FIG. 4 illustrates one exemplary multimedia client program interface 400 and that other multimedia client programs or interfaces may be used. Furthermore, the multimedia client program interface 400 may include a variety of features and displays, and those features and displays discussed above are meant only to illustrate sample features and displays. Examples of features are included and described below. In other embodiments, the multimedia client program interface 400 may provide a variety of media related to a variety of subjects, such as, for example, advertisements related to the multimedia client program, third party advertisements, messages related to the user's content, messages related to the user's account and subscription, and so forth. Moreover, the appearance of the multimedia client program interface 400 may take different forms, for example, there may be one or more of the video section 410, the contextual data section 420, and the media section 430, they may be positioned differently, or they may not appear at all on the multimedia client program interface 400.

2. Access-Controlled Multimedia Client Program

In one embodiment, access to media offerings and features through the multimedia client program 310 may be controlled. In one embodiment, the users may be assigned a user identification and password to access the media offerings through the multimedia client program 310. The user identification and password may be maintained on the server system 110, on the client system 120, with the media provider 140, or any other location where data can be maintained. In one embodiment, the user identification and password may be maintained in the client information database 220 or on the cookie database 320 or on both.

In one embodiment of the invention, the media delivery system may require the user to submit the user's user identification and password before the media delivery system will deliver media to the user. The process of the user gaining access or attempting to gain access to any system, device or process is referred to as a "sign in" or "log in." A sign in that provides the user with the desired access to the system, device or process is referred to as a successful sign in. The request for user identification and password may be managed by the server system 110, on the client system 120, with the media provider 140, or another system. In one embodiment, if the user fails to successfully sign-in to the media delivery system, the media delivery system presents the user with the opportunity to obtain the appropriate subscription and the associated user identification and password.

III. Subscription-Based Media Delivery System

As noted above, the multimedia client program may provide both free media and content ("free media") or media and content that requires a subscription ("subscription-based media"). Subscription-based media may be provided to the users through various financial, contractual, or promotional arrangements. Subscription-based media may also be provided in any type of arrangement such as, for example, on a monthly, weekly, annual, pay-per-view, flat fee, free, or trial basis. Subscription-based media may require the user to register with the media provider supplying the media, with a third party, or may not require any registration.

Furthermore, the media delivery system may provide a plurality of media subscription levels or tiers. Tiers refer to levels or packages of media subscriptions, with multiple tiers referring to a scenario where multiple subscription packages are available to users. Each media subscription level may include a different combination of media offerings or features. Each media subscription level may also offer different features associated with the operation of the multimedia client program. For example, a particular subscription level may provide a multimedia client program that allows for enhanced video or audio viewing experience, such as, for example, by including an audio equalizer, and the like. Examples of such features are included and described below.

A. On-Screen Indicator of Subscription Requirement

Figure 5:
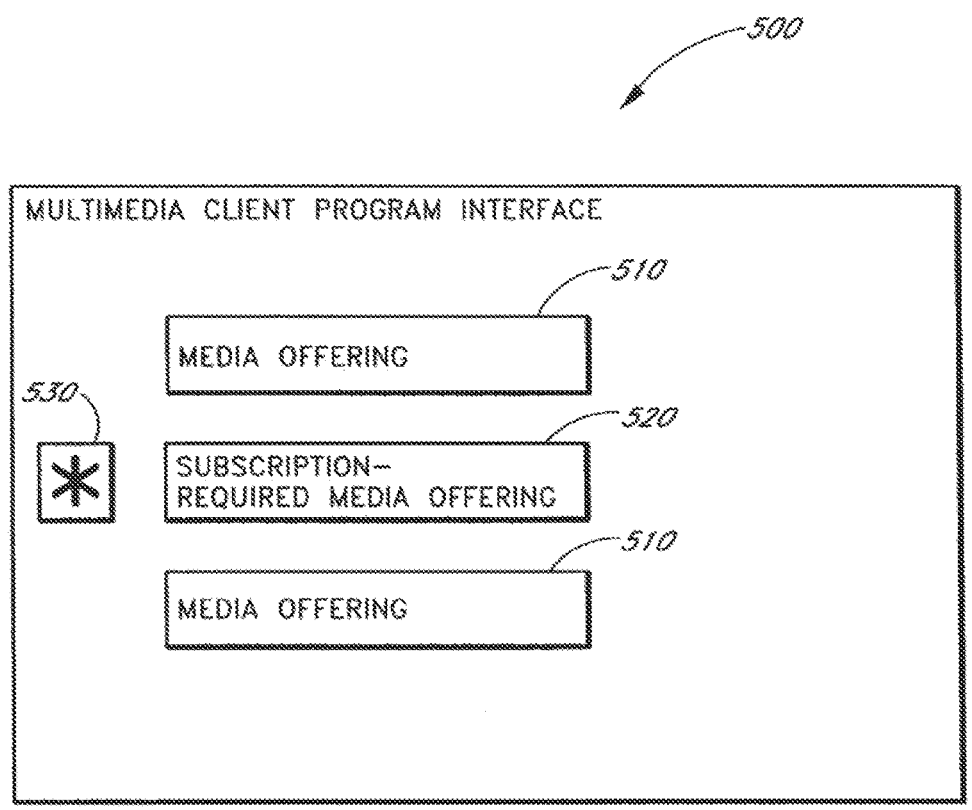
FIG. 5 illustrates another display screen layout of a multimedia client program interface, according to aspects of an embodiment of the invention.

FIG. 5 illustrates an exemplary multimedia client program interface 500 of a multimedia client program 310 to illustrate an on screen indicator of subscription requirement, according to aspects of an embodiment of the invention. As illustrated, the multimedia client program interface 500 includes a media offering 510 and a subscription-required media offering 520. In other embodiments, there may be one or more media offerings 510 or none at all, and similarly, there may be one or more subscription-required media offerings 520 or none at all. The media offering 510 includes any media that is available for the user's access. Examples of the media offering 510 include a news clip, a television program, a promotional program, a movie, a sound recording, or any other type of media. The media offering 510 may be offered through the media server 210, from one or more media providers 140, or through any other source of media. The subscription-required media offering 520 comprises any media that is available for the user's access provided that the user has the required subscription for that media. Examples of the media offering 520 include a news clip, a television program, a promotional program, a movie, a sound recording, or any other type of media. The subscription-required media offering 520 may be offered through the media server 210, from one or more media providers 140, or through any other source of media.

Also, as illustrated in FIG. 5, in one embodiment, the multimedia client program interface 500 comprises an on-screen indicator of subscription requirement 530. The on-screen indicator of subscription requirement 530 may comprise any visual indicator or symbol to notify the user that the media offering associated with the indicator requires a subscription. For example, the on-screen indicator of subscription requirement 530 may comprise a symbol such as a star, an asterisk, a dollar sign, an icon, an animated object, a screen object, and the like. If the user selects a subscription-required media offering, the integrated media delivery system 100 determines if the user has the required subscription. If the user has the required subscription to receive the subscription-required media offering, the user is provided with the media. This process is illustrated herein with reference to FIG. 6 ("Subscription-based Media Delivery System"). If the user does not have the required subscription to receive the subscription-required media offering, the integrated media delivery system 100 provides the user with an opportunity to acquire the necessary subscription, as illustrated in the process flow diagram of FIG. 7.

B. Subscription-Based Media Delivery System

Figure 6:
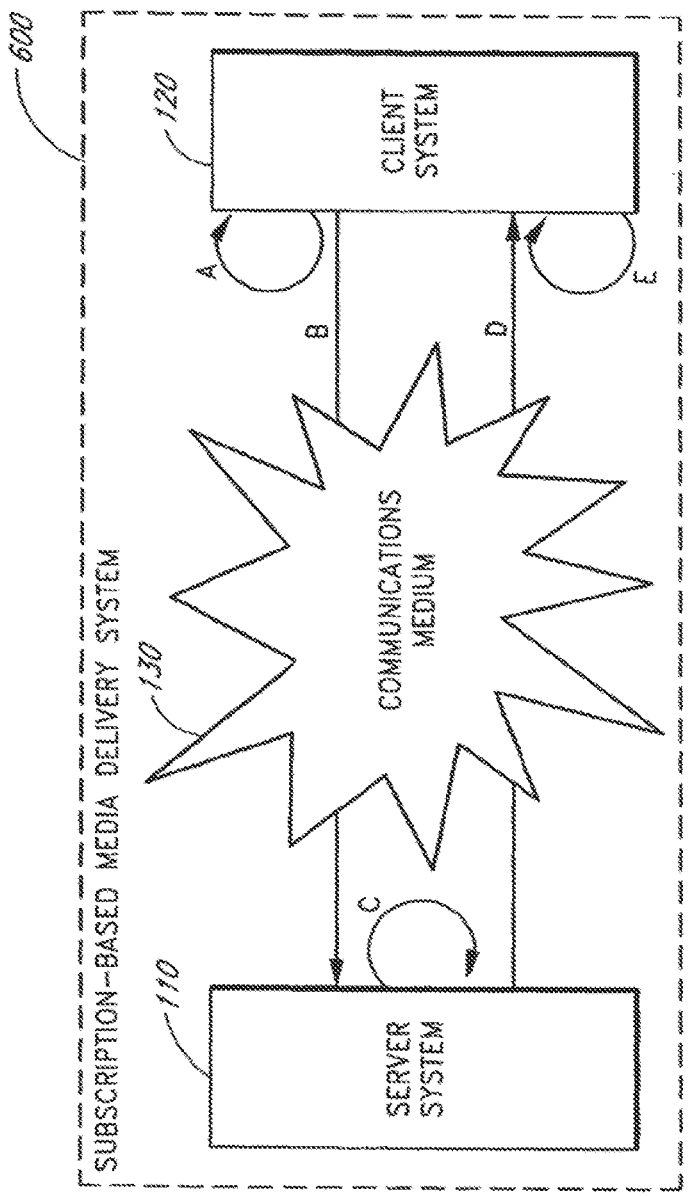
FIG. 6 illustrates a sample flow of information in a subscription-based media delivery system.

FIG. 6 illustrates a sample flow of information, such as media, between the server system 110 and the client system 120 in a subscription-based media delivery system 600. In event A, the user of the client system 120 initiates the client system 120, such as, for example, by starting the computer, by starting the multimedia client program, or by requesting media. In event B, the client system 120 sends a message to the server system 110 requesting a certain media selection. In event C, the server system 110 determines the media to be sent to the user and then verifies if the user has the appropriate subscription to receive the media. In event D, the server system 110 sends the media to the client system 120. In event E, the client system 120 presents the media to the user of the client system 120.

C. Presenting Multimedia Client Program According to Subscription Level

As discussed in the foregoing, and in reference to FIG. 3, the integrated media delivery system 100 presents media to the user of the client system 120 through the multimedia client program 310. In one embodiment of the invention, the appearance and function of the multimedia client program 310 may differ according to the media subscription level associated with the user. In one embodiment, a user at a particular media subscription level may receive more or less advertising and marketing content than a user at another media subscription level, and the advertising may be targeted towards the user based on the information maintained regarding the user in the client information database 220. As another example, a user with a particular media subscription level may be enabled with access to more or less tools and functions of the multimedia client program 310. For example, the multimedia client program 310 may be enabled with tools for video and audio manipulation that are offered to some users according to the user's media subscription level. Although examples are provided in the foregoing, it is to be understood that the multimedia client program 310 may be presented to a user with various functions, tools, appearances, and content according to the user's media subscription level and the information maintained about the user. Moreover, there may be various media subscription levels including various media offerings and features.

D. Marketing a Subscription Upgrade

There may be occasions where the user of the client system requests certain media but the user does not have the proper subscription to receive that media. It is advantageous under such a scenario to offer the user an opportunity to obtain the proper subscription. This process is often called "up selling." The proper subscription offered may take many forms, such as, for example, a monthly or annual subscription, a trial subscription, a free subscription with registration, a free registration if a survey is completed, a pay-per-view arrangement, a flat fee arrangement, and the like.

Figure 7:
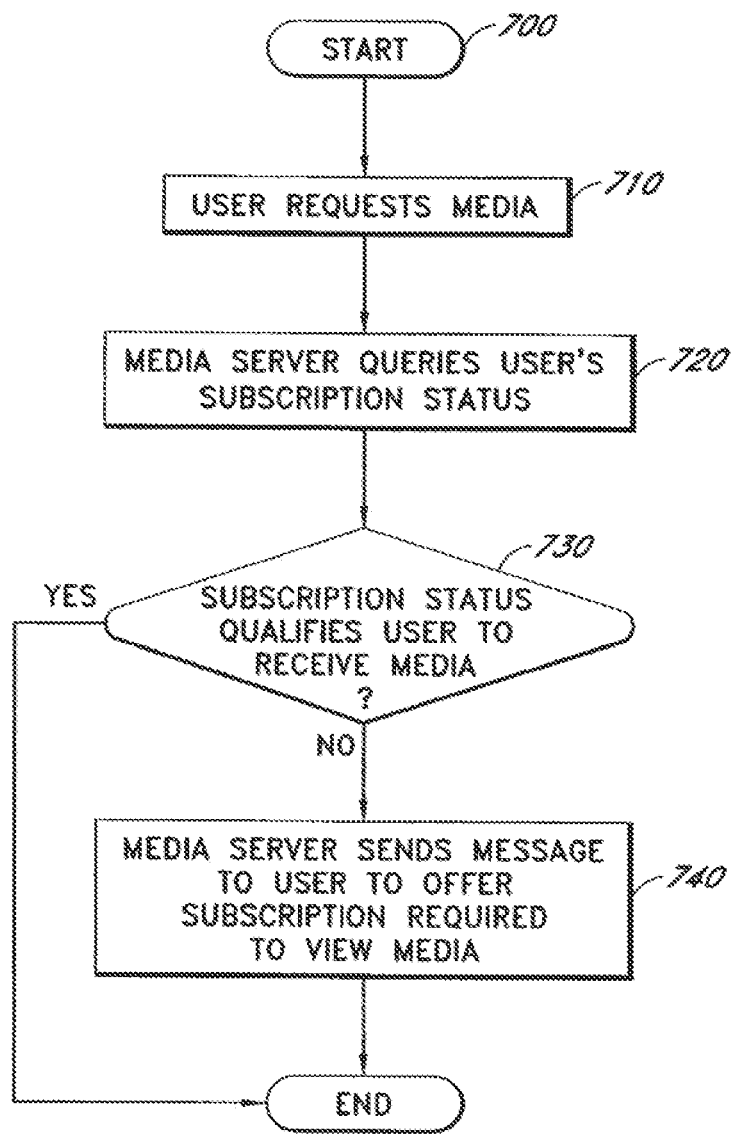
FIG. 7 illustrates a process flow diagram for marketing a subscription upgrade process, according to aspects of an embodiment of the invention.

FIG. 7 illustrates a process flow diagram for marketing a subscription upgrade process 700 to users of a client system, according to aspects of an embodiment of the invention. As illustrated, the process starts at a block 710 when the user of the client system 120 requests media. At a block 720, the media server 210 queries the user's subscription status. This query may be in various forms, for example, by querying the user's information from the server system 110 or from a cookie on the client system 120. At a decision block 730, the media server 210 determines if the user's subscription status qualifies the user to receive the requested media. If the user's subscription status qualifies the user to receive the requested media, the media server 210 sends the requested media to the user's client system 120, and the process 700 ends. If the user's subscription status does not qualify the user to receive the requested media, the process proceeds to a block 740. At the block 740, the media server sends a message to the user's client system 120 to offer the user the opportunity to obtain the subscription required to receive the requested media The message to the user may take various forms, including graphic, video, audio, hypertext, and the like. After the offer, the opportunity to obtain the subscription required is presented to the user, and the process 700 ends.

IV. User-Defined Media Delivery System

As described above, the multimedia client program may provide both free media and subscription-based media. Moreover, the media provided to the user, whether free or subscription-based, may originate from one or more media providers.

A. Media Selection and Media Packaging

At some point, such as during the subscription process, the user may select the media that the user wishes to receive. Media selection refers to the media or media content selected, desired, or requested by the user. In one embodiment, each user may select a different combination of media to receive. For example, a first user may obtain a subscription that provides that user with media from CNN®, The Weather Channel®, and Fox Sports®, while a second user may select iFilm®, ABC News®, CNN®, and CNN Sports Illustrated®. Therefore, the integrated media delivery system 100 advantageously enables users to receive the media that they are interested in. Moreover, the integrated media delivery system 100 advantageously enables users to pay only for the media that they are interested in. For example, if there is a cost to receiving CNN®, and the user does not wish to receive CNN®, the user does not hereto select CNN® as one of their media providers.

In another embodiment, media providers or other parties may offer certain media sources as a package ("media package"). A media package may include any number of media sources or a combination thereof. For example, a media package may include sixteen media sources including CNN® and the like, while another media package may only contain four media sources. Media packages may be selected using various criteria or reasons. For example, a media package may include news sources such as CNN®, The Weather Channel®, Fox Sports®, and the like, while another media package may include media sources from a particular affiliation such as CNN®, CNN Sports Illustrated®, and CNN Money®. As it can be seen, the media packages may be selected on any basis and presented for subscription to the user.

B. Managing Media Selections and Media Packages

Information about the user's media selection or the user's subscription to a media package may be maintained using various methods and systems. In one embodiment, the information may be maintained on the server system 110 within the client information database 220, as discussed above and illustrated in FIG. 2. In another embodiment, the information may be maintained on the client system 120, as discussed above and illustrated in FIG. 3. However, as can be seen, the information may be maintained in any location and in any manner.

By maintaining individualized information on each user's media selection, the integrated media delivery system 100 advantageously enables users to receive a personalized multimedia experience. Users are presented with the media that they have chosen to receive. Moreover, marketing campaigns may be directed to the user based, at least in part, on the user's media selection. For example, a user that subscribes to a news network (e.g. CNN®, ABC News®, etc.) may receive marketing information that relates to the news. To continue with the previous example, if in the future a new news network is introduced, a subscription to that news network may be marketed to current subscribers of CNN®.

C. Allocating Subscription Fees

The subscription fees paid by users may be allocated between media providers and other parties using various systems and methods. In one embodiment, the subscription fee may be allocated to a media provider according to the number of users that have included that media provider in their subscription. In another embodiment, the subscription fee allocated to a media provider may be a fixed amount. In another embodiment, the subscription fee may be allocated to a media provider according to the number of times users access that media provider's media offerings. In another embodiment, the subscription fee may be allocated to a media provider according to the type of media offerings provided by that media provider. For example, a media provider may be allocated a higher or lower subscription fee if the media offering is a television show as compared to a weather report. As can be seen, there are various systems and methods for allocating subscription fees to media providers, and the invention is not limited to any particular system or method of fee allocation.

FIG. 8 is a screen shot illustrating an example of a video features screen that may be displayed by the media delivery system. The video features displayed in the example of FIG. 8 are a Universal Player feature, a high quality video feature, a Turbo Play feature, and an Advanced Video Controls feature. The video features shown in FIG. 8 are examples only, as many additional video features may also be displayed and available to the user, as may fewer video features be displayed and available than in FIG. 8.

Figure 9:
FIG. 9 is a screen shot illustrating an example of an audio features screen that may be displayed by the media delivery system.

FIG. 9 is a screen shot illustrating an example of an audio features screen that may be displayed by the media delivery system. The audio features displayed in the example of FIG. 9 include an Advanced CD Burning feature, an Analog Recording feature, a Multiple Audio Formats feature, and a 10-Band Graphic EQ feature. Additionally, the audio feature screen may also include a High Bitrate Encoding feature, a Crossfade feature, a Visualizations feature, an Album Info feature, and a Portable Device feature. The audio features shown in FIG. 9 are examples only, as many additional audio features may also be displayed and available to the user, as may fewer audio features be displayed and available than in FIG. 9.

Figure 10:
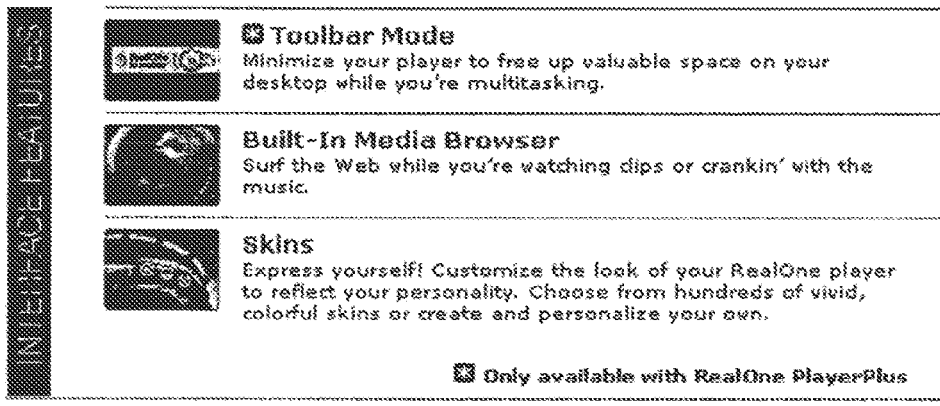
FIG. 10 is a screen shot illustrating an example of an interface features screen that may be displayed by the media delivery system.

FIG. 10 is a screen shot illustrating an example of an interface features screen that may be displayed by the media delivery system. The interface features displayed in the example of FIG. 10 are a Toolbar Mode feature, a Built-In Media Browser feature, and a Skins feature. The interface features shown in FIG. 10 are examples only, as many additional interface features may also be displayed and available to the user, as may fewer interface features be displayed and available than in FIG. 10.

Figure 11:
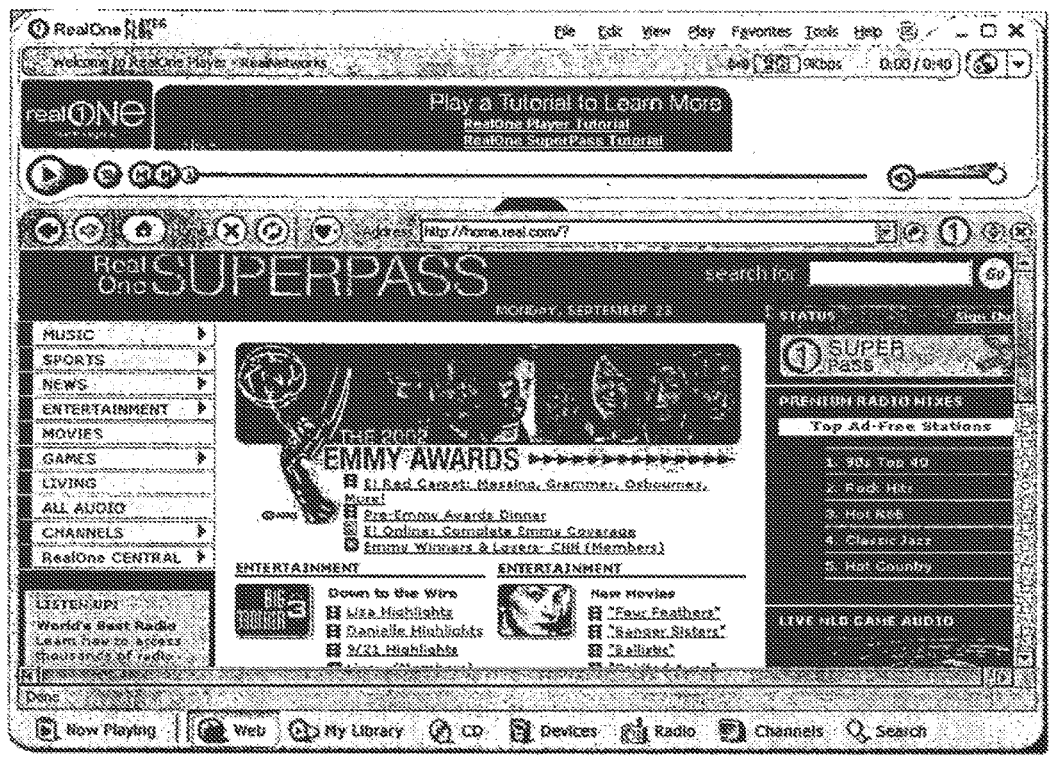

FIG. 11 is a screen shot illustrating an example of a screen that may be displayed by the media delivery system 100 when the user is signed in. The screen in FIG. 11 shows features and content that are available only to registered users of the system 100.

Figure 12:

FIG. 12 is a screen shot illustrating an example of a screen that may be displayed by the media delivery system when the user is not signed in. The screen in FIG. 12 shows features and content that are available to unregistered users of the system 100.

Figure 13:
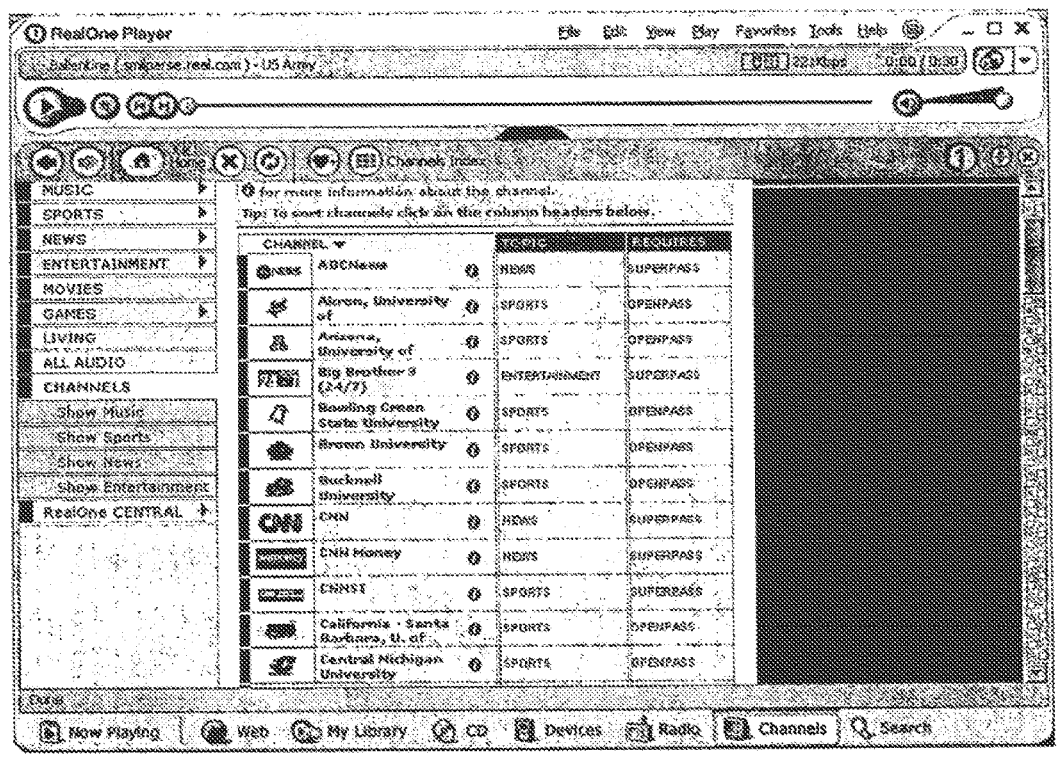
FIG. 13 is a screen shot illustrating an example of a screen displaying some channels that are available from certain media providers.

FIG. 13 is a screen shot illustrating an example of a screen displaying some channels that are available from certain media providers. For example, some of the channels listed in FIG. 13 include ABC News, University of Akron, CNN, CNN Money, and CNNSI. Of course, more and fewer channels than those shown in FIG. 13 may be displayed and available for user selection.

The various screen shots shown in FIGS. 9-13 are examples of certain features, functions, and displays that may be made available by the media delivery system 100. These examples are provided to illustrate some possible features available and not to be limiting in any way. The features of FIGS. 8-13 also illustrate that some features are made available according to subscription level. For example, the advanced media controls features are made available through a particular subscription level, such as, for example, RealOne PlayerPlus®.

The present invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

The invention claimed is:

1. A computer implemented method for providing electronic access to electronic media content, the method comprising:
a computer receiving over a network from a user computing device a subscription fee for a subscription plan allowing a level of access to media content for a period of time, the access corresponding to user designation to include one or more media content providers from a plurality of media content providers in the subscription plan, a plurality of devices of the plurality of media content providers in communication with the computer, wherein the media content is media content made available by the one or more media content providers;

the computer receiving a designation from the user computing device, over the network, to include a given media content provider in the subscription plan, wherein the one or more media content providers includes the given media content provider, and wherein the designation to include the given media content provider thereby allows access under the subscription plan to a plurality of media offerings of the given media content provider;

the computer providing to the user computing device the access over the network to the media content via an application of the user computing device, the computer configured to provide network support to the application to enable the user computing device to access media content of each of the plurality of media content providers through the application if designated by the user;

the computer activating a plurality of features of the application based on the level of access to the media content; and the computer providing the given media content provider a portion of the subscription fee, wherein the computer determines the portion based on a number of users who have included the given media content provider in their subscription plan.

2. The method of claim 1, wherein the media content comprises audio and video content.

3. The method of claim 1, wherein the media content is streamed over the internet.

4. The method of claim 1, further comprising:

the computer receiving over the network from a second user computing device a second subscription fee for a subscription plan allowing the second user access to media content from the given media content provider; and the computer providing the given media content provider a portion of the second subscription fee from the second user.

5. An apparatus to provide electronic access to electronic media, comprising:

one or more communication interfaces configured to enable communication with a user computing device of a user and a plurality of media provider devices of a plurality of media content providers;

electronic memory to store a designation from the user;

one or more processors configured to:
    receive, through the one or more communication interfaces, the designation from the user to include a media content provider, from the plurality of media content providers, in a subscription plan;
    receive over a network through the one or more communication interfaces from the user computing device a subscription fee for the subscription plan allowing the user computing device access to media content from the media content provider, the access for a period of time and corresponding to the designation of the media content provider as included in the subscription plan, the media content from the media content provider comprising a plurality of media offerings;
    provide to the user computing device the access over the network to the media content for the period of time via an application running on the user computing device;
    provide network support to the application to enable the user computing device to access media content of each of the plurality of media content providers through the application if designated by the user;
    activate a plurality of features of the application based on the user's access to the media content corresponding to the media content provider; and
    provide the media content provider a portion of the subscription fee, wherein the computer determines the portion based on a number of users who have included the media content provider in their subscription plan.

6. The apparatus of claim 5, wherein the one or more processors are further configured to receive from the user a request for additional media content.

7. The apparatus of claim 6, wherein the one or more processors are further configured to determine that the user qualifies to receive the additional media content.

8. The apparatus of claim 6, wherein the user is qualified to receive the additional media content if the additional media content is included in the media content available under the subscription plan.

9. The apparatus of claim 6, wherein the one or more processors are further configured to provide to the user the access over the network to the additional media content for the period of time.

10. The apparatus of claim 5, wherein the one or more processors are further configured to determine that the user does not qualify to receive the additional media content.

11. The apparatus of claim 10, wherein the user is not qualified to receive the additional media content if the additional media content is not included in the media content available under the subscription plan.

12. The apparatus of claim 10, wherein the one or more processors are further configured to send the user an opportunity to increase the subscription fee to qualify the user to receive the additional media content.

13. A non-transitory computer-readable storage medium having stored thereon instructions that, when implemented by a computing device, cause the computing device to:

receive a designation from a user computing device of a user to include two or more media content providers, from a plurality of media content providers corresponding to a plurality of media provider devices in electrical communication with the computing device, in a subscription plan;

receive over a network from the user computing device a subscription fee for the subscription plan allowing the user access to media content from the two or more media content providers, the access for a period of time and corresponding to the designation of the two or more media content providers as included in the subscription plan, the media content from the two or media content providers comprising a plurality of media offerings from each of the two or more media content providers;

provide to the user the access over the network to the media content for the period of time via an application of the user computing device;

provide network support to the application to enable the user computing device to access media content of each of the plurality of media content providers through the application if designated by the user;

the computer activating a plurality of features of the application based on the user's access to the media content corresponding to the two or more media content providers; and provide each of the two or more media content providers a portion of the subscription fee, wherein the portion is based on a number of users who have included the two or more media content providers in their subscription plan.

14. The non-transitory computer-readable storage medium of claim 13, further comprising instructions to enable the user to select additional media content providers.

15. The non-transitory computer-readable storage medium of claim 13, further comprising instructions to enable the user to deselect one or more of the two or more media content providers.

* * * * *